Patented Oct. 31, 1950

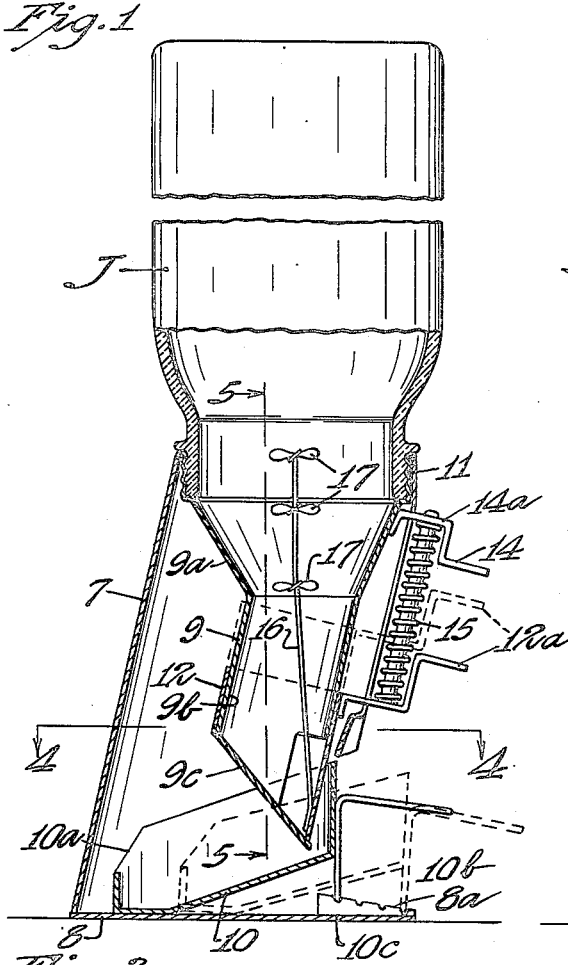
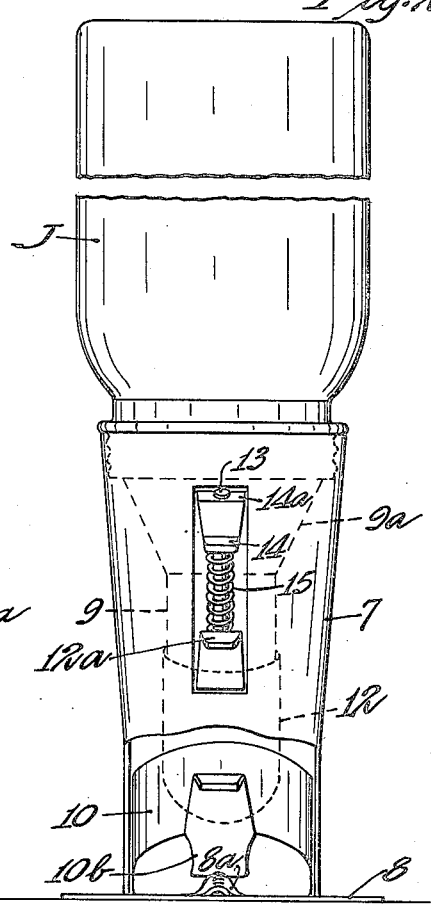
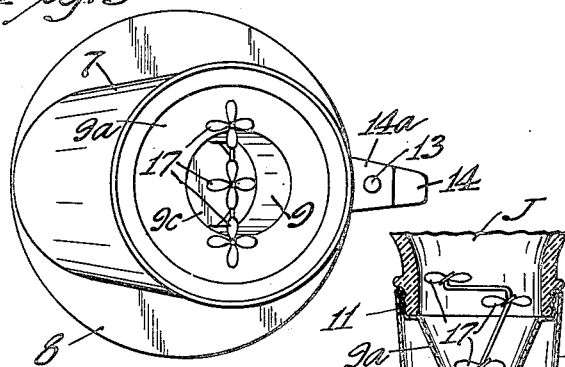
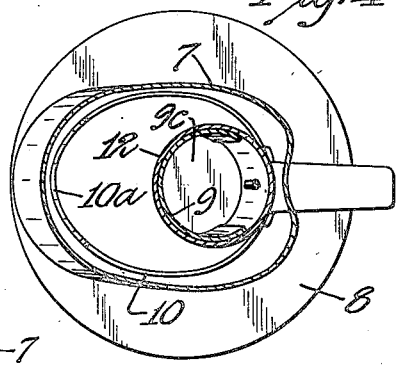
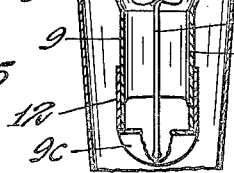

2,527,749

UNITED STATES PATENT OFFICE 2,527,749

SELECTIVE MEASURING DISPENSER DRAWER TYPE

John Alfred Lundeen, Pequot Lakes, Minn.

Application July 5, 1945, Serial No. 603,390

2 Claims. (Cl. 222—437)

This invention relates to dispensing devices and particularly, to a device for selectively dispensing a number of predetermined quantities of granular material.

It is an object of my present invention to provide a simple, comparatively inexpensive and efficient device for accurately measuring and dispensing various predetermined quantities of granular material such as coffee, sugar, flour and the like.

A further object is the provision of a measuring dispenser to which a conventional jar containing coffee or other granular material, may be readily attached in inverted style and which may be quickly adjusted to dispense and measure a variety of different quantities of material.

More specifically, it is an object to provide a measuring dispenser having a discharge spout so related with a transversely adjustable receptacle that the relative positioning of said receptacle and the subsequent accumulation of material in a portion thereof, will control the quantity of material dispensed in one discharge operation, whereby a number of different measurements may be accurately dispensed.

Another object is the provision of a measuring dispenser of the class described having means for simultaneously opening the discharge spout for flow of material therefrom and agitating or loosening material to facilitate flow thereof, associated and operatively combined with a selectively adjustable receptacle for receiving the material to measure a plurality of different quantities of material from the same source of supply.

These and other objects and advantages of my invention will be more apparent from the following description made in connection with the accompanying drawings, wherein like reference characters refer to the same parts throughout the several views and in which—

Fig. 1 is a side view of an embodiment of my invention mostly in vertical section and particularly in side elevation;

Fig. 2 is a front elevation of the same;

Fig. 3 is a top plan view of the device with the supply container removed;

Fig. 4 is a cross section taken on the line 4—4 of Fig. 1; and

Fig. 5 is a fragmentary, vertical section taken substantially on the line 5—5 of Fig. 1.

In the form of the invention illustrated, I provide an upstanding tubular casing 7 which may conveniently be constructed of sheet material or plastic and which is secured to and supported from a disc base 8. The axis of casing 7 as illustrated, is inclined forwardly somewhat to the base to facilitate overhanging relationship of a discharge spout 9 to a transversely adjustable receiving member or receptacle 10. Discharge spout 9 is of funnel shape, the upper flared section 9a thereof, being substantially axially disposed relatively to the upper end of casing 7 while the lower and cylindrical portion 9b of spout 9, has its axis extending substantially parallel to the axis of casing 7 but mounted eccentrically thereof adjacent the forward wall of the casing. The front wall of the cylindrical portion 9b of spout 9 is cut away to provide a substantially rectangular discharge opening and the spout is provided with an inclined stationary bottom 9c fixed to the lower edge of the cylindrical portion 9b, whereby material may be guided downwardly and forwardly when said discharge opening is uncovered. The bottom 9c of the spout thus forms a depending, inclined guiding plate extending to the lower edge of the discharge opening.

The upper end of casing 7 is provided with an annular seat 11 for securing an inverted supply container to the device in connection with the spout 9 and as shown, comprises a collar formed quite similarly to the peripheral wall of a fruit jar top having a coarse internal thread for engagement with the threaded neck of a conventional jar J. It will, of course, be understood that any suitable seat for securing a suitable supply container may be utilized.

A skirt valve 12 surrounding the lower end of discharge spout 9 is provided for covering and uncovering the discharge aperture of the spout and as shown, conforms in shape to the lower portion 9b of the spout and is slidable upon the medial and cylindrical portion of the spout by manipulation of an outwardly extending finger piece or handle 12a which as shown, is in the form of an offset arm having an angled attachment foot at the lower end thereof, spot-welded or otherwise rigidly secured to the outer wall of the upper portion of skirt valve 12. Offset arm 12a, as shown, rigidly carries an upstanding pin 13, which is slidable through the intermediate portion 14a of a stationary offset finger piece 14 having its inner end affixed to casing 7 and having its outer arm substantially vertically aligned with the handle or finger piece 12a and disposed in spaced relation thereto. A coil spring 15 is interposed between the intermediate portions of finger pieces 14 and 12a and surrounds pin 13, thereby urging the skirt valve downwardly to normal closed position, with the finger pieces 12a and 14 spaced widely apart.

An upstanding agitator rod 16 is rigidly fixed at its lower end to the valve skirt 12 and as shown, extends first upwardly through the lower and medial portion of spout 9, having mounted near to the lower end of the funnel of the spout, a propeller-shaped, multi-blade agitator 17 and then extends above said first agitator in an inclined direction towards one side of the funnel portion 9a and is then bent at an angle approaching 90° and terminating short of the opposite side of the funnel portion of the spout with a short upturned end whereon a second propeller-like agitator 17 is mounted. A third agitator 17, of similar construction to the two first described, is mounted at the intermediate portion of agitator rod 16 just before the rod is bent angularly, all of said propeller-shaped agitators being disposed with their axes parallel to and longitudinally of the casing in the upper portion of the discharge spout. The agitator rod is of course, bodily moved in an upward direction when the valve skirt 12 is raised by pressing the handle 12a upwardly in cooperation with the stationary finger piece 14.

The measuring and receiving receptacle 10, as shown, is in the form of an oval shaped pan having an open top and having the upper portion thereof, at the inner end, cut away at 10a, to accommodate or clear the lower depending portion of the discharge spout 9. Receptacle 10 is adjustable, transversely of the axis of spout 9 to receive and measure various predetermined quantities of granular material. To this end, the forward part of the receptacle as shown, is supported on a vertical leg 10b which terminates at its lower end in a knife edge 10c for engagement selectively with a notched rib 8a which is provided by the base 8 and extends radially thereof at the front of the device and inclining upwardly, from its outer to its inner ends.

The point is that in the embodiment of my invention, the receptacle 10 is disposed just below the discharge of the spout with the forward edge of the bottom 9c spaced a slight distance above the bottom of the receptacle, whereby accumulation of discharge material against the front of the receptacle and accumulated against the discharge opening controls the discharge flow, blocking the same, when the accumulation is sufficient. To give greater adjustability in measuring with comparatively small variance in the position of receptacle 10, I incline the bottom of the measuring receptacle as shown in Fig. 1, with the forward portion of the bottom of the receptacle raised some distance, above the inner end of the receptacle. This inclination of the bottom of receptacle 10 in combination with the opposite inclination of the notched supporting bead 8a, provides for a substantial variance in the spaced relationship of the lower point of the discharge spout with the bottom of the receptacle with a comparatively small transverse adjustment of the receptacle and thus, I am able to control the measurement accurately from a small quantity of material to a relatively large quantity by adjustment of receptacle 10, through comparatively short range. For example, in the embodiment I can measure from two to eight cups of coffee by a shifting movement of receptacle 10 of only, approximately, one inch.

The embodiment of my invention illustrated, is particularly designed for measuring a number of predetermined quantities of ground coffee, although it will of course, be understood that by properly designing the relationship of the lower end of discharge spout 9 and diameter of the same, with the bottom of the receptacle used, it may be equally adapted for measuring other granular material, such as sugar, flour, chemicals, and so forth.

The notched bead 8a indicates various measurements. For example, if coffee is to be measured, the various notches may indicate the positioning of the receptacle to measure and receive coffee for two cups, four cups, six and eight cups of coffee. The receptacle is properly adjusted for measuring the amount desired, by positioning the same with the knife edge 10c disposed in the appropriate notch of the indicator. Thereafter, the movable handle arm 12a is lifted by squeezing the same upwardly, using the stationary arm 14 as the base of resistance. This action lifts valve skirt 12 and simultaneously, agitates or probes the contents of the jar and spout at three spaced points therein and material flows forwardly and outwardly of the discharge spout through the discharge opening, in the front and lower portion thereof. The discharging material accumulates against the front wall of the receptacle 10, backing up to a point where it stops the further flow from the discharge spout 9. Handle arm 12a is released and the discharge opening then covered by skirt 12, whereafter the receptacle can be withdrawn from the bottom of the housing 7 and a predetermined measurement of granular material has then been obtained.

In dispensing and measuring, the handle member 12a is only raised for a matter of two or three seconds, which is sufficient to dispense the predetermined amount required.

My device is quite accurate in operation, inexpensive in construction and greatly facilitates the measurement and obtaining of various predetermined amounts of granular material, with little effort.

It will, further, be seen that with my improved structure, food materials are housed within container J and the spout 9 and that very little air will be introduced into the spout and container during the dispensing of the material. Consequently, my structure has a high efficiency for preserving such food materials as coffee over a long period of time, while nevertheless enabling measured quantities to be readily dispensed with very little effort.

It will of course, be understood that various changes may be made in the form, details, arrangement and proportions of the parts without departing from the scope of my invention.

What is claimed is:

1. A device for selectively dispensing several different predetermined quantities of granular material having in combination a discharge spout having a discharge opening at the lower portion of one side thereof and having a depending inclined bottom extending to the lower edge of said opening, readily controllable means for closing said opening, a receptacle having a bottom inclined from its inner to its outer end and adapted to be positioned in a number of different, transverse relations to said depending spout-bottom and having an outer upstanding end opposing and spaced from said plate for cooperating therewith to back up delivered material and stop the discharge of further material and a graduated supporting element mounted below said spout and having a fixed relation therewith and having an inclined supporting surface for supporting at least the outer end of said receptacle whereby through adjustment of said receptacle over said supporting surface, a relatively great variance in the spaced relation of the delivery end of said spout and the bottom of said receptacle may be obtained with a comparatively small adjustment in said transverse relationship of said receptacle.

2. A measuring dispensing device for granular material comprising a substantially vertically disposed discharge member having a substantially closed bottom and provided with a lateral discharge opening at one side thereof, shiftable closure means for normally closing said discharge opening and shiftable to uncover said opening for discharge of material laterally from said discharge member and a receptacle slidably mounted below said discharge member for adjustment in a plurality of different transverse positions relative to the lower end of said discharge member, said receptacle having an upstanding outer wall opposed to said discharge opening to cause backing up of discharged material thereagainst, and a transversely graduated member mounted below the outer end of said receptacle and over which said outer end is slidable to determine various receiving positions of said receptacle.

JOHN ALFRED LUNDEEN.

REFERENCES CITED

The following references are of record in the file of this patent:

UNITED STATES PATENTS

| Number | Name | Date |
|---|---|---|
| 169,113 | Mainer | Oct. 26, 1875 |
| 502,124 | Keeler | July 25, 1893 |
| 1,015,638 | Rogers | Jan. 23, 1912 |
| 1,351,251 | Jewell | Aug. 31, 1920 |
| 1,913,767 | Mills | June 13, 1933 |
| 2,363,155 | Smith | Nov. 21, 1944 |